(12) United States Patent
Jourdan et al.

(10) Patent No.: US 7,475,225 B2
(45) Date of Patent: Jan. 6, 2009

(54) METHOD AND APPARATUS FOR MICROARCHITECTURE PARTITIONING OF EXECUTION CLUSTERS

(75) Inventors: Stephan J. Jourdan, Portland, OR (US); Avinash Sodani, Hillsboro, OR (US); Alexandre J. Farcy, Hillsboro, OR (US); Per Hammarlund, Hillsboro, OR (US); Sebastien Hily, Hillsboro, OR (US); Mark C. Davis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 12 days.

(21) Appl. No.: 11/322,768

(22) Filed: Dec. 30, 2005

(65) Prior Publication Data

US 2007/0157006 A1  Jul. 5, 2007

(51) Int. Cl.
*G06F 9/30* (2006.01)
(52) U.S. Cl. .................. 712/218; 712/214
(58) Field of Classification Search ............ 712/18, 712/214, 218
See application file for complete search history.

(56) References Cited

U.S. PATENT DOCUMENTS

| | | | | |
|---|---|---|---|---|
| 5,805,853 | A * | 9/1998 | White et al. | 712/218 |
| 6,219,780 | B1 * | 4/2001 | Lipasti | 712/215 |
| 6,311,261 | B1 * | 10/2001 | Chamdani et al. | 712/23 |
| 6,704,856 | B1 * | 3/2004 | Farrell et al. | 712/215 |
| 6,728,866 | B1 * | 4/2004 | Kahle et al. | 712/215 |
| 6,766,440 | B1 * | 7/2004 | Steiss et al. | 712/218 |
| 7,120,780 | B2 * | 10/2006 | Moudgill | 712/24 |
| 7,373,485 | B2 * | 5/2008 | Ando et al. | 712/218 |
| 7,380,105 | B2 * | 5/2008 | Veidenbaum et al. | 712/214 |

OTHER PUBLICATIONS

Benitez, Manuel E. et al., "Code Generation for Streaming: an Access/Execute Mechanism," 1991 ACM 0-89791-380-9/91/0003-0132.
Smith, James E., Decoupled Access/Execute Computer Architectures, ACM Transactions on Computer Systems, vol. 2, No. 4, Nov. 1984, pp. 289-308.
Smith, J. E. et al., "The ZS-1 Central Processor," 1987 ACM 0-89791-238-1/87/1000-0199.

\* cited by examiner

*Primary Examiner*—Eddie P Chan
*Assistant Examiner*—Jacob Petranek
(74) *Attorney, Agent, or Firm*—Blakely, Sokoloff, Taylor & Zafman LLP

(57) ABSTRACT

Microarchitecture policies and structures partition execution resource clusters. In disclosed microarchitecture embodiments, micro-operations representing a sequential instruction ordering are partitioned into a two sets. To one set of micro-operations execution resources are allocated from a cluster of execution resources that can perform memory access operations but not branching operations. To the other set of micro-operations execution resources are allocated from a cluster of execution resources that can perform branching operations but not memory access operations. The first and second sets of micro-operations may be executed out of sequential order but are retired to represent their sequential instruction ordering.

12 Claims, 7 Drawing Sheets

METHOD AND APPARATUS FOR MICROARCHITECTURE PARTITIONING OF EXECUTION CLUSTERS

FIELD OF THE Disclosure

This disclosure relates generally to the field of microprocessors. In particular, the disclosure relates to microarchitecture policies and structures to partition execution resource clusters.

BACKGROUND OF THE DISCLOSURE

In modern microprocessors, many techniques are used to increase performance. Pipelining is a technique for exploiting parallelism between different instructions that have similar stages of execution. These stages are typically referred to, for example, as instruction-fetch, decode, operand-read, execute, write-back, etc. By performing work for multiple pipeline stages in parallel for a sequence of instructions the effective machine cycle time may be reduced and parallelism between the stages of instructions in the sequence may be exploited.

Superscalar execution is a technique that attempts to initiate more than one instruction in a single machine cycle and typically employs multiple pipelines to execute these instructions in parallel, thereby further exploiting parallelism between independent instructions in an instruction sequence. Such scheduling may be performed statically (by a compiler prior to program execution) or dynamically (by processor hardware during program execution). It will be appreciated that dependencies exist between successive pipeline stages, which may cause delays (sometimes called bubbles) in the execution flow.

An architectural technique that has been used to increase processor performance is a decoupling of memory accesses from execution of operations, which is sometimes referred to as a load/store architecture. In accordance with such architectures, memory accesses are performed by specific load or store instructions and other operations use register (rather than memory) operands. Some architectures provide a register file for addressing memory and a separate register file for holding data. In alternative architectures, the memory access instruction stream may be architecturally separate from, and executed in parallel with the execution instruction stream, where coordination and synchronization are performed either by software or by architectural queues.

Such architectural approaches have been used to restrict the kind of resources used by instructions of a particular type. Typically, compiler techniques are relied upon to statically generate only instructions which adhere to those restrictions and manage coordination and synchronization. One drawback to such an approach is that preexisting programs may need to be recompiled to comply with the new restrictions. In general, no reduction in required resources can be guaranteed for programs that do not comply.

In other alternative architectures, a micro-architecture is employed where instructions may be decoded into multiple micro-operations (sometimes called u-ops) such that memory accesses are performed by specific load or store micro-operations and other micro-operations fetch operands from internal (and architecturally invisible) registers. It will also be appreciated that there exist inherent dependencies between the micro-operations that load operands into these internal registers and the micro-operations that fetch operands from the internal registers. Such dependencies may also cause delays in the execution flow.

In alternative micro-architectures, to further exploit any parallelism between independent micro-operations, the micro-operations may be executed out-of-sequential-order, and yet retired in the original sequential order. When more and more parallelism is exploited through such techniques, it will be appreciated that the number of concurrent micro-operations and the complexity of resources to manage communication and synchronization between the micro-operations may also increase.

Modern micro-architectures may include policies and structures to support concurrent execution of instructions including register renaming, speculation, out-of-order execution, pipelining, multithreading, and dynamic superscalar execution of micro-operations. In some cases hundreds or thousands of storage, scheduling, execution and communication resources are employed to support such advanced processing techniques.

In order to provide processors at the best possible price/performance ratio, it is desirable to reduce any resources required while supporting processing techniques, which are as advanced as possible.

Techniques are desired to exploit parallelism between independent operations and efficiently manage dependencies, communication and synchronization. It would be desirable to find a microarchitecture that can dynamically reduce the required execution resources for preexisting programs, and at the same time, can support processing techniques that are as advanced as possible.

BRIEF DESCRIPTION OF THE DRAWINGS

The present invention is illustrated by way of example and not limitation in the figures of the accompanying drawings.

DETAILED DESCRIPTION

Microarchitecture policies and structures partition execution resource clusters. For one microarchitecture embodiment, micro-operations representing a sequential instruction ordering are partitioned into a two sets. To one set of micro-operations execution resources are allocated from a cluster of execution resources that can perform memory access operations but not branching operations. To the other set of micro-operations execution resources are allocated from a cluster of execution resources that can perform branching operations but not memory access operations. The first and second sets of micro-operations are executed out of sequential order and are retired to represent their original sequential instruction ordering.

It will be appreciated that in alternate embodiment predictions may be made according to various other criteria, for example, one set of micro-operations is predicted to involve execution resources to perform all operations leading to a memory access operation and a second set of micro-operations is predicted to involve execution resources to perform any other operations not leading to memory access. In the following description, therefore, embodiments of the present invention is illustrated by way of example and not limitation. These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 1:
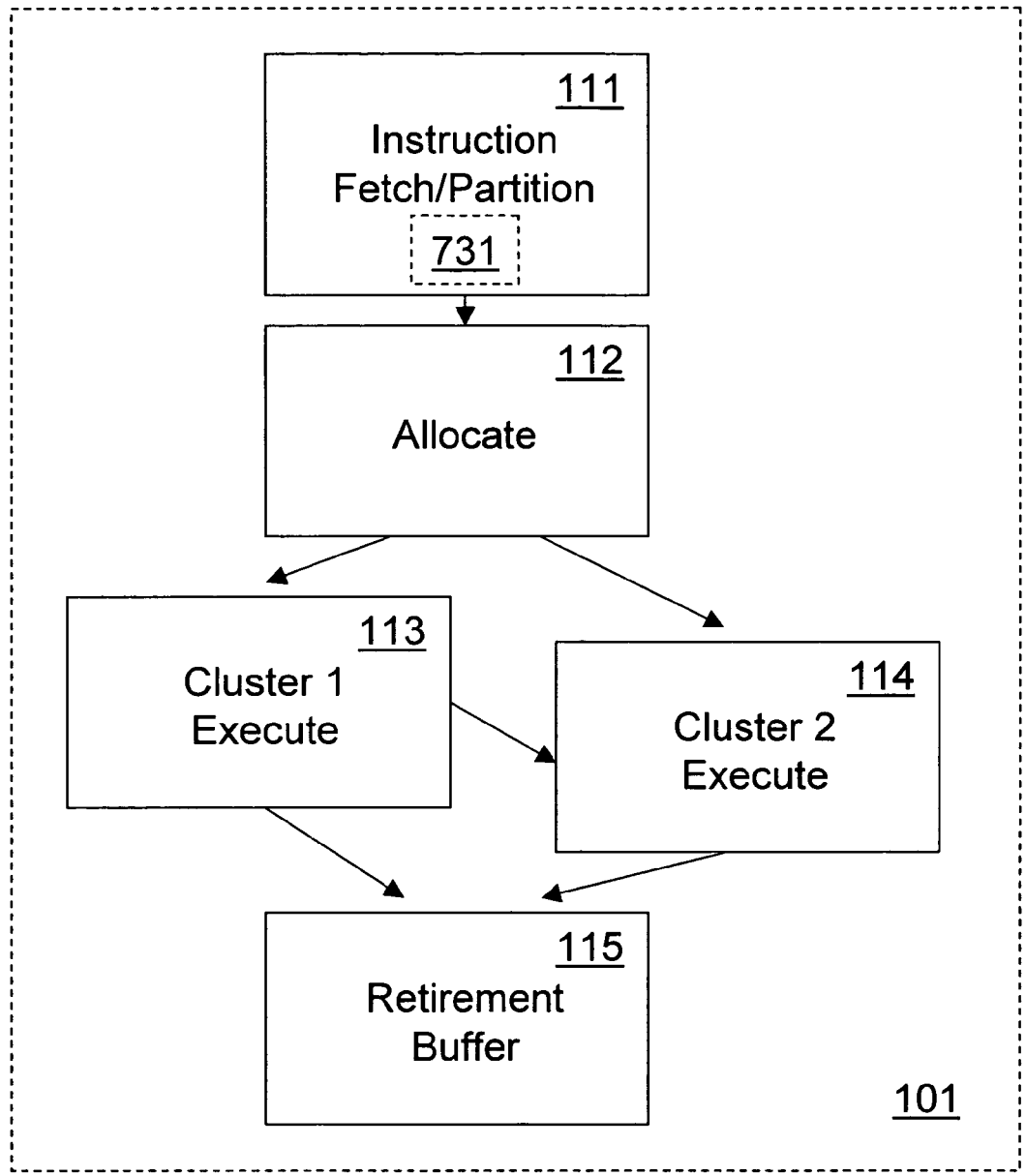
FIG. 1 illustrates one embodiment of a microarchitecture partitioning of execution clusters in a processor.

FIG. 1 illustrates one embodiment of a microarchitecture partitioning 101 of execution clusters 113 and 114 in a processor. Microarchitecture partitioning 101 in a processor may include instruction fetch/partition logic 111 to fetch macro-instructions according to a sequential instruction ordering. Instruction fetch/partition logic 111 optionally includes a communication tracker 731. In one embodiment, communication tracker 731 may identify a communication direction for a plurality of micro-operations representing the sequential instruction ordering, the plurality of micro-operations being partitioned into a first set of producer micro-operations and a second set of consumer micro-operations. In an alternative embodiment, communication tracker 731 may identify a communication between two micro-operations of different sets. The microarchitecture partitioning 101 also includes a first cluster of execution resources 113 including, in one embodiment, execution resources to perform memory access operations and a second cluster of execution resources 114, in one embodiment, distinct from but coupled with the first cluster of execution resources 113 to receive data through inter-cluster communication registers. It will be appreciated that in alternative embodiments data may be sent or received by either cluster of execution resources. Some embodiments of the second cluster of execution resources 114 may also include execution resources to perform control branching operations. The microarchitecture partitioning 101 includes allocation logic 112 to allocate resources such as local registers or inter-communication registers, for example, from the first cluster of execution resources 113 to the first set of producer micro-operations, and also to allocate execution resources from the second cluster of execution resources 114 to the second set of consumer micro-operations. The microarchitecture partitioning 101 includes retirement logic and retirement buffer 115 to retire the first and second sets of micro-operations so as to represent the original sequential instruction ordering. As will be discussed in greater detail below with regard to alternative embodiments, retirement buffer 115 may communicate with instruction fetch/partition logic 111 to dynamically improve partitioning of micro-operations.

Figure 2:
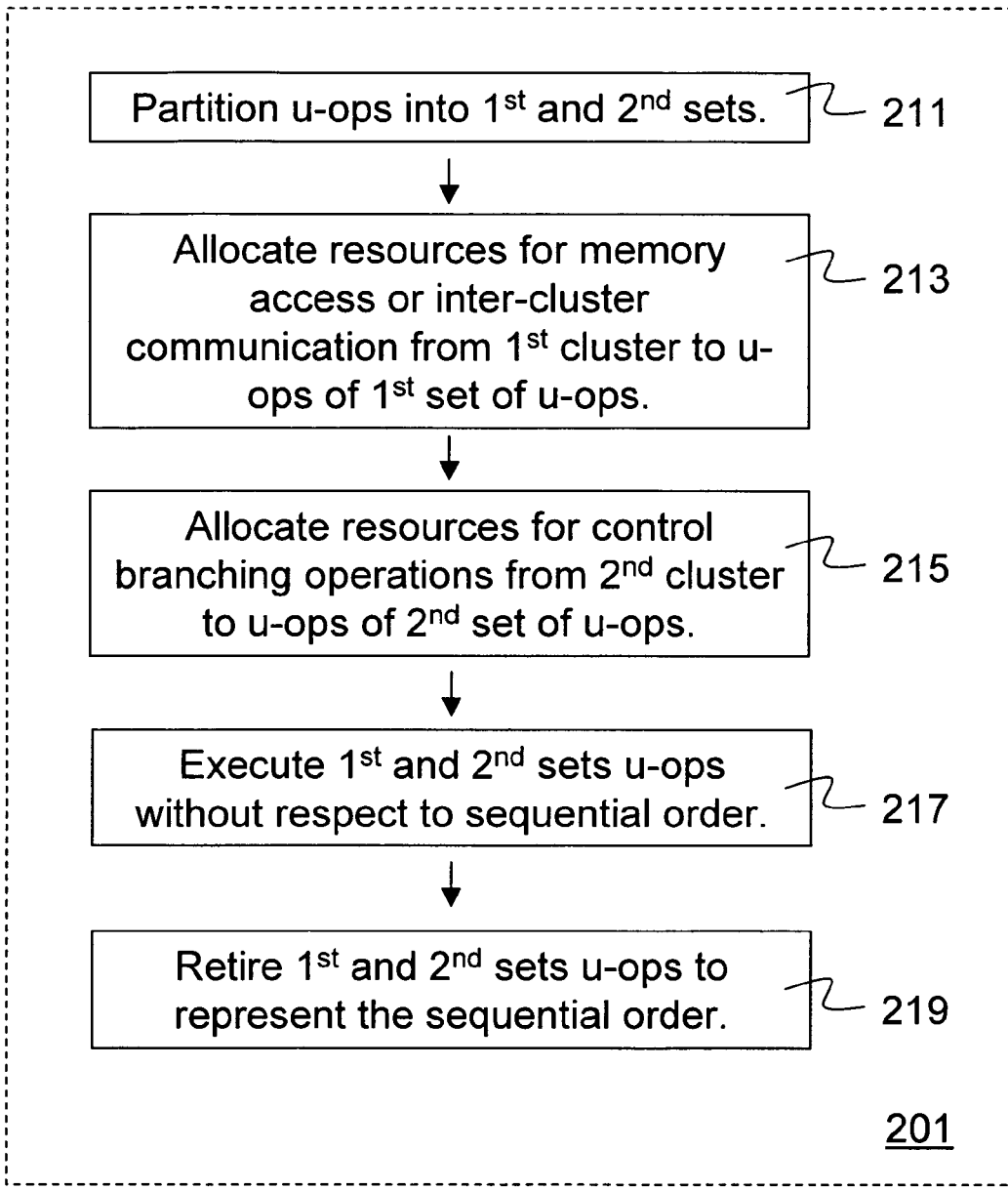
FIG. 2 illustrates a flow diagram for one embodiment of a process to dynamically partition execution in a processor.

FIG. 2 illustrates a flow diagram for one embodiment of a process 201 to dynamically partition execution in a processor. Process 201 and other processes herein disclosed are performed by processing blocks that may comprise dedicated hardware or software or firmware operation codes executable by general purpose machines or by special purpose machines or by a combination of both.

In processing block 211 micro-operations representing a sequential instruction ordering are partitioned into a first set of micro-operations and a second set of micro-operations. Then in processing block 213 execution resources from a first cluster of execution resources are allocated to the first set of micro-operations. In one embodiment, the first cluster of execution resources may include local registers, execution resources to perform memory access operations and writable inter-cluster communication registers but, for example, does not typically include execution resources to perform control branching operations. In processing block 215 execution resources from a second cluster of execution resources are allocated to the second set of micro-operations. In one embodiment, the second cluster of execution resources may include, local registers, execution resources to perform control branching operations and readable inter-cluster communication registers but, for example, does not typically include execution resources to perform memory access operations. It will be appreciated that in some embodiments both the first and second clusters of execution resources may, in fact, include writable and readable inter-cluster communication registers, but the number of write ports in one cluster may be substantially greater than the number of write ports in the other cluster, thereby providing for more efficient use of resources. Processing continues in processing block 217 where the first and second sets of micro-operations are executed, for example, by the first cluster of execution resources 113 and the second cluster of execution resources 114 respectively. It will be appreciated that in some embodiments the first and second sets of micro-operations may be executed out of their original sequential order as long as data dependencies among them are preserved, which may provide for additional exploitation of parallelism in independent instructions while reducing the execution resources required for each cluster. Finally, in processing block 219, the first and second sets of micro-operations are retired to represent the original sequential instruction ordering.

Figure 3:
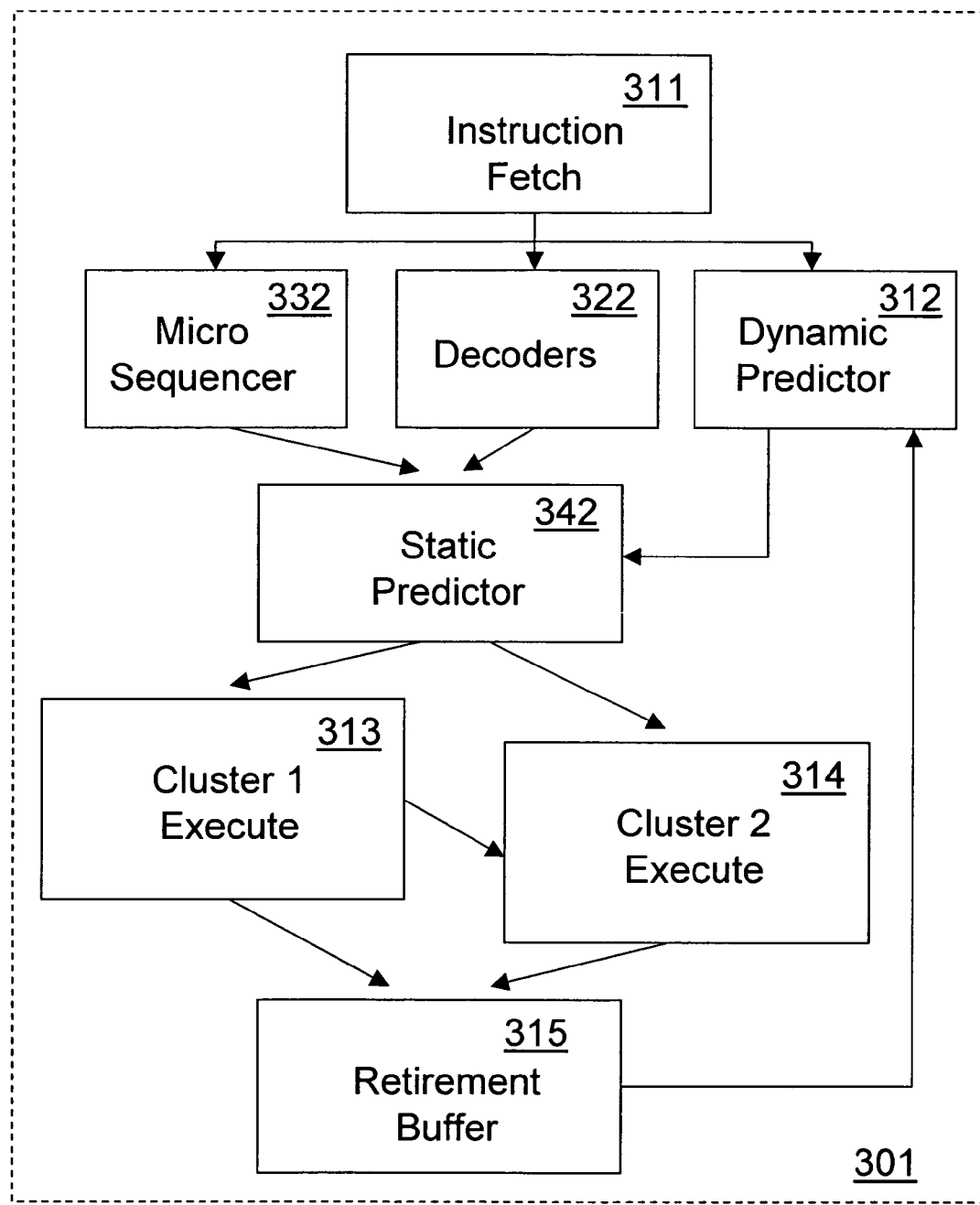
FIG. 3 illustrates an alternative embodiment of a microarchitecture prediction of execution clusters in a processor.

FIG. 3 illustrates an alternative embodiment of a microarchitecture prediction mechanism 301 for prediction of execution clusters 313 and 314 in a processor. The microarchitecture prediction mechanism 301 includes an instruction fetch unit 311, a micro sequencer 332 and a decoder 322 to decode macro-instructions having a sequential instruction ordering into micro-operations representing that sequential instruction ordering. The microarchitecture prediction mechanism 301 also includes a dynamic predictor 312, in one embodiment, to predict which micro-operations belong to a first set of micro-operations to perform memory access operations or provide inter-cluster data communications, and also to predict which micro-operations belong to a second set of micro-operations to perform control branching operations or to depend upon those inter-cluster data communications from the first set of micro-operations. For alternative embodiments, dynamic predictor 312 may predict all micro-operations leading to or providing results for memory access operations to belong to the first set of micro-operations and all other micro-operations to belong to the second set of micro-operations. In some embodiments, dynamic predictor 312 may operate in parallel with micro sequencer 332 and a decoder 322 to predict (for example from address data associated with the fetched instruction) which micro-operations belong to the first and second sets before the decoded micro-operations are available.

Embodiments of the microarchitecture prediction mechanism 301 may also include a static predictor 342 to switch any micro-operation from the first set to the second set whenever it is statically predicted (for example from the decoded micro-operation) to perform a control branching operation and also to switch any micro-operation from the second set to the first set whenever it is statically predicted to perform a memory access operation (or even, in some embodiments, to provide data needed by another micro-operation to perform a memory access). For one embodiment of micro sequencer 332, complex instructions may be translated into long flows of micro-operations and a static prediction may be stored with each micro-operation in the micro-code ROM. For example, one such embodiment may store a two-bit static prediction for each micro-operation indicating if static prediction for that micro-operation should always select the first set, always select the second set, select the set indicated by the dynamic prediction, or reverse the selection indicated by the dynamic prediction.

Next, a first cluster of execution resources 313 executes the first set of micro-operations and a second cluster of execution resources 314 executes the second set of micro-operations in accordance with the predictions and a retirement buffer 315 retires the micro-operations to reflect the original sequential instruction ordering they represent. It will be appreciated that prediction mechanism 301 as described above has a beneficial characteristic of limiting substantially all inter-cluster communications to being from micro-operations executed in the first execution cluster to micro-operations executed in the second execution cluster. For some embodiments as little as none or one inter-cluster communication registers may provide data from micro-operations executed in the second execution cluster to micro-operations executed in the first execution cluster thus greatly reducing the complexity of the inter-cluster communication register file. It will be appreciated that even if the frequency of write occurrences to inter-cluster communication registers from the second execution cluster can not be completely eliminated but only significantly reduced, read/write access to inter-cluster communication registers may be provided for both clusters with as little as one write port being employed in the second cluster while numerous write ports are employed in the first cluster.

This beneficial characteristic of prediction mechanism 301 may be improved through intelligent updating of the dynamic predictions with hindsight information from the retirement buffer 315. For one embodiment of prediction mechanism 301, the retirement buffer 315 is coupled with the dynamic predictor 312 to update dynamic predictions for a micro-operation as it is retired from retirement buffer 315. For example, an earlier micro-operation in retirement buffer 315 may be switched from the second set of micro-operations to the first set of micro-operations if, according to the sequential instruction ordering, a later micro-operation of the first set is identified as dependent upon an inter-cluster communication from the earlier micro-operation.

For one embodiment, dynamic predictor 312 may provide a two-bit dynamic prediction for all micro-operations associated with a particular macro-instruction address. In accordance with such an embodiment, updating a dynamic prediction for the macro-instruction associated with a micro-operation as it is retired from retirement buffer 315 may be performed by incrementing or decrementing a two-bit saturating counter based on whether its micro-operations are in the first or second set respectively at the time they are removed from the retirement buffer 315.

For example, one embodiment of a two-bit dynamic prediction from dynamic predictor 312 with updates for a micro-operation (u-op) being marked as belonging to either the first or second set of micro-operations at the time of its removal from retirement buffer 315 is given below in Table 1.

TABLE 1

| Prediction | Update for u-op in $1^{st}$ set | Update for u-op in $2^{nd}$ set |
|---|---|---|
| 00-$2^{nd}$ cluster set, high confidence | 01-$2^{nd}$ cluster set, low confidence | 00-$2^{nd}$ cluster set, high confidence |
| 01-$2^{nd}$ cluster set, low confidence | 10-$1^{st}$ cluster set, low confidence | 00-$2^{nd}$ cluster set, high confidence |
| 10-$1^{st}$ cluster set, low confidence | 11-$1^{st}$ cluster set, high confidence | 01-$2^{nd}$ cluster set, low confidence |
| 11-$1^{st}$ cluster set, high confidence | 11-$1^{st}$ cluster set, high confidence | 10-$1^{st}$ cluster set, low confidence |

Figure 4:
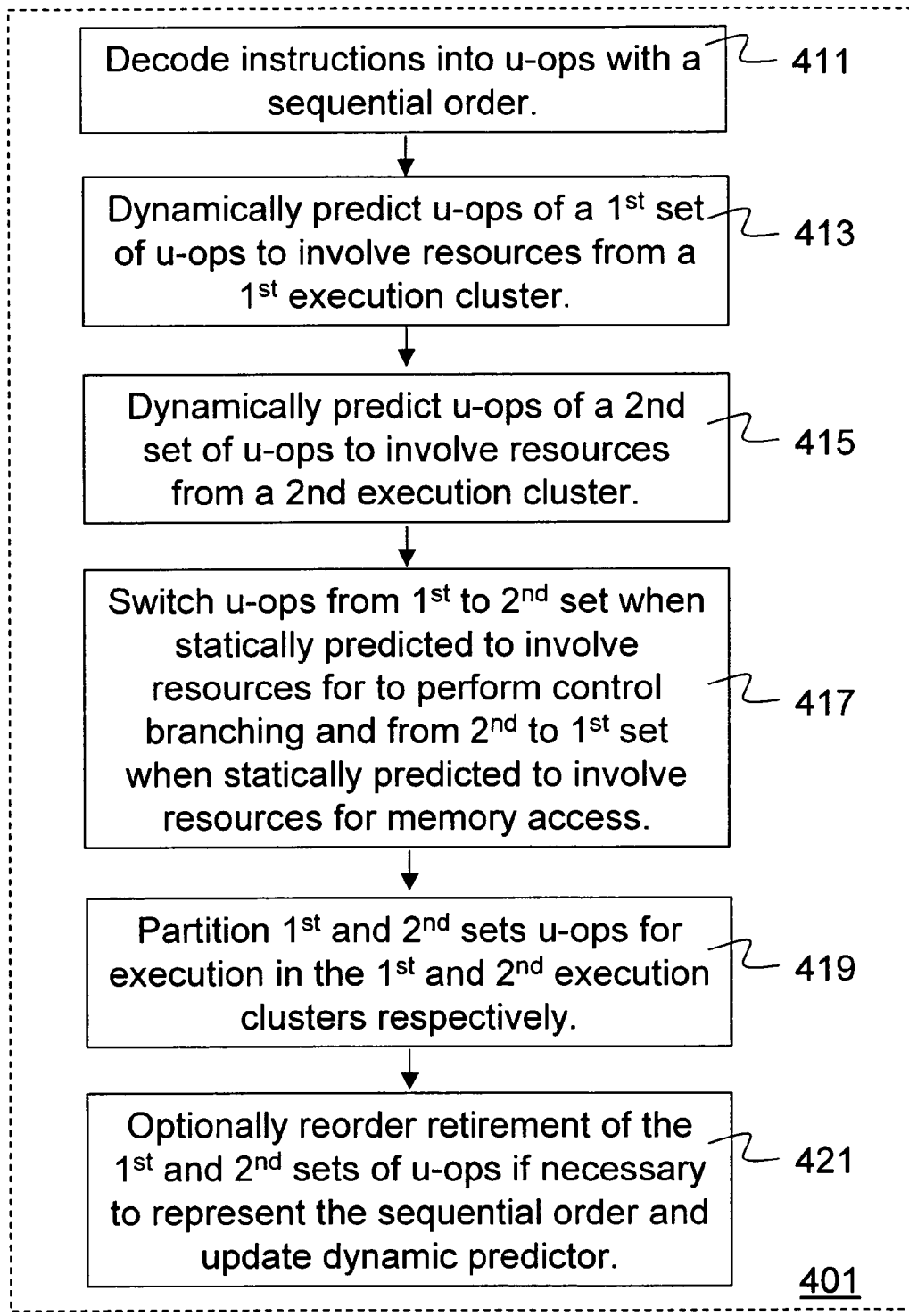
FIG. 4 illustrates a flow diagram for an alternative embodiment of a process to dynamically partition execution in a processor by prediction of execution clusters.

FIG. 4 illustrates a flow diagram for an alternative embodiment of a process 401 to dynamically partition execution in a processor by prediction of execution clusters. In processing block 411, macro-instructions are decoded into micro-operations representing the sequential macro-instruction order. Processing continues in processing block 413 where a first set of micro-operations is dynamically predicted to involve execution resources form the first cluster, for example, memory access operations and/or inter-cluster data communications. Similarly in processing block 415 a second set of micro-operations is dynamically predicted to involve execution resources from the second cluster, for example, to perform control branching operations and/or being dependent upon an inter-cluster data communication from one of said first set of micro-operations. In processing block 417 micro-operations from the first set are switched to the second set whenever they are statically predicted (from a decoded operation code for that micro-operation, for example) to perform a control branching operation and alternatively micro-operations from the second set are switched to the first set whenever they are statically predicted to perform a memory access operation. In processing block 419 the micro-operations are partitioned for execution in accordance with their predictions, the first set of micro-operations to the first execution cluster and the second set of micro-operations to the second execution cluster. Then in processing block 421, retirement of the first and second sets of micro-operations are optionally reordered if necessary to represent the original sequential order, and the dynamic predictor 312 is optionally updated as micro-operations are removed from the retirement buffer 315.

Figure 5:
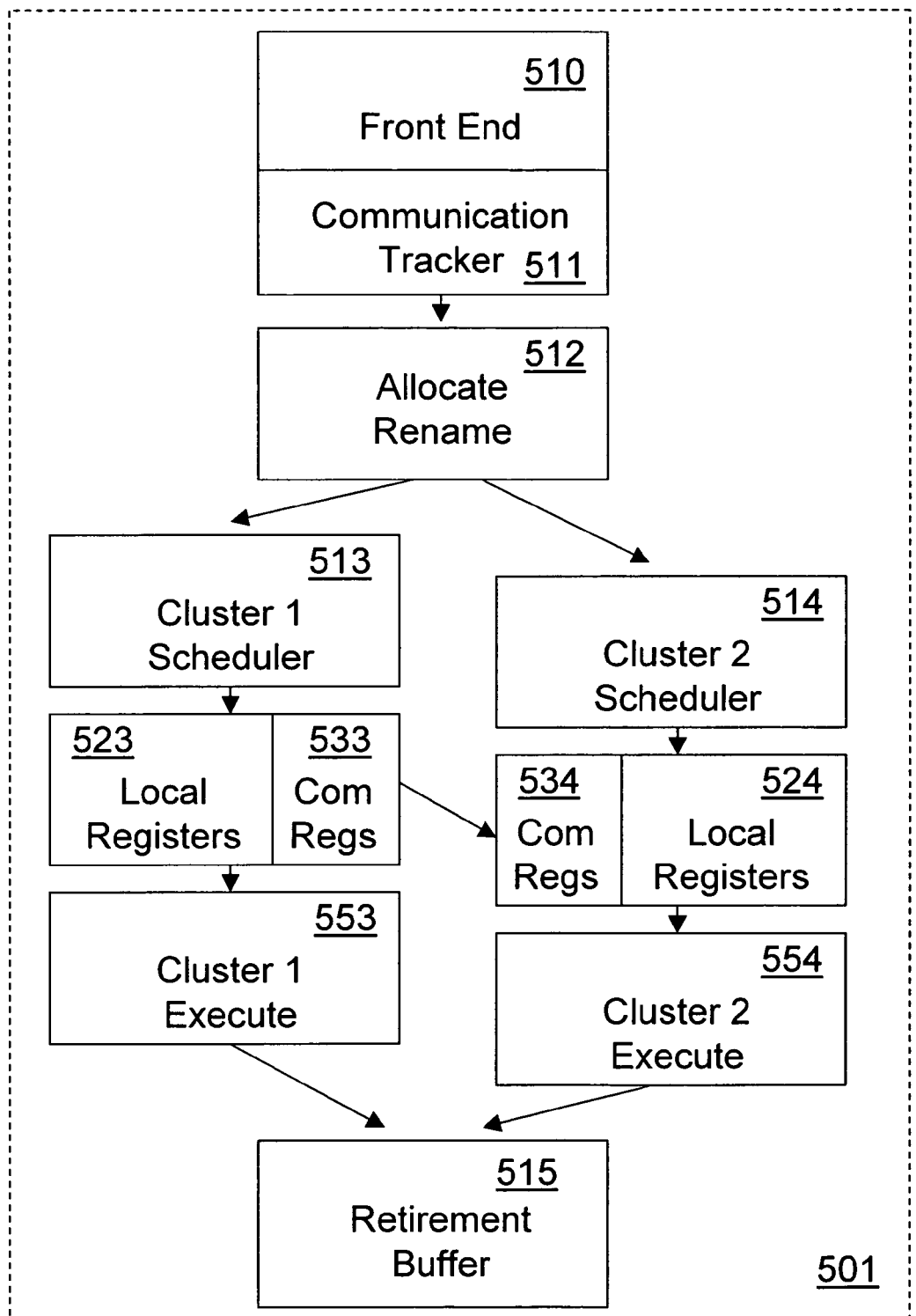
FIG. 5 illustrates an embodiment of a microarchitecture partitioning of cluster resources in a processor according to inter-cluster communications.

FIG. 5 illustrates an alternative embodiment of a microarchitecture partitioning 501 of cluster resources in a processor according to inter-cluster communications. Embodiments of a microarchitecture partitioning 501 include a front end 510, which as describe above may include a decoder 322 to decode macro-instructions into micro-operations representing the sequential macro-instruction order, a dynamic predictor 312 to predict a first set of micro-operations to perform memory access operations or inter-cluster communication, and a second set of micro-operations to perform control branching operations or that depend upon an inter-cluster communication from one of the micro-operations of the first set, a static predictor 342, in some embodiments to switch micro-operations from the first set to the second set whenever a micro-operation is statically predicted to perform a control branching operation or to switch micro-operations from the second set to the first set whenever a micro-operation is statically predicted to perform a memory access operation. Microarchitecture partitioning 501 also includes a communications tracker 511 to track data dependencies between micro-operations according to the sequential macro-instruction order and an allocate/rename logic 512 to allocate and/or rename registers for particular micro-operations being tracked by communications tracker 511.

For some embodiments of microarchitecture partitioning 501, a first execution cluster may have access to a set of local registers 523 and a set of inter-cluster communication registers 533, which are substantially unidirectional in that they serve primarily to transmit data from the first execution cluster to the second execution cluster. A second execution cluster may have access to a set of local registers 524 and a set of inter-cluster communication registers 534, of which substantially all may be read-only copies of inter-cluster communication registers 533 and having the same addresses. Inter-cluster communication registers may be referred to below as push registers or as pull registers for the sake of distinguishing between two methods of allocating them to micro-operations. Some embodiments of inter-cluster communication registers 533 and 534 have no real functional differences between a push register and a pull register and they may be used interchangeably. But, as described above, substantially less write ports may be employed, for example, in registers 534 than are employed in registers 533.

One embodiment of allocate/rename logic 512 allocates a local register when a later micro-operation is identified to depend upon data from an earlier micro-operation of the same set of micro-operations. Allocate/rename logic 512 allocates a push inter-cluster communication register when the later micro-operation is identified to depend upon data from an earlier micro-operation, which is not of the same set. This "push" allocation is particularly efficient, for example, when the earlier micro-operation is still being tracked by the communication tracker 511 and allocate/rename logic 512 can still allocate an inter-cluster communication register for the earlier micro-operation. Allocate/rename logic 512 allocates a pull inter-cluster communication register to receive a copy of a local register when the later micro-operation is identified to depend upon data in that local register and the local register is not one that can be allocated to micro-operations of the same set as the later micro-operation. In other words, if an earlier micro-operation of a different set was allocated a local register and allocate/rename logic 512 can no longer allocate an inter-cluster communication register for that earlier micro-operation, an inter-cluster communication register is allocated for the later micro-operation and an additional micro-operation is inserted to copy the data from the local register into the newly allocated inter-cluster communication register. This method can be called "pull" allocation.

Microarchitecture partitioning 501 also includes a first cluster of execution resources including cluster 1 scheduler 513, local registers 523, inter-cluster communication register 533 and cluster 1 execution units 553 to execute the first set of micro-operations and a second cluster of execution resources including cluster 2 scheduler 514, local registers 524, inter-cluster communication register 534 and cluster 2 execution units 554 to execute said second set of micro-operations in accordance with said predictions. For one embodiment of microarchitecture partitioning 501, micro-operations may be executed out of their sequential order. A retirement buffer 515 retires the micro-operations in accordance with the sequential instruction ordering they represent. As described above, embodiments of retirement buffer 515 may be coupled with a dynamic predictor 312 to update a dynamic prediction for a micro-operation as it is retired.

It will be appreciated that there is a skewing of execution clusters, the first execution cluster executing micro-operations that are much earlier in the program flow that the second execution cluster. For one embodiment of microarchitecture partitioning 501, retiring the first set of micro-operations may include writing results into a reorder buffer (ROB) to maintain a precise exception model wherein the cluster skewing allows for local retirement and early reclaiming of local registers 523 as soon as they are overwritten. For another embodiment of microarchitecture partitioning 501, the required number of local registers 524 may be reduced by aggressively allocating execution resources to the second set of micro-operations including allocation of local register resources prior to their retirement since it may be predicted that they will not be needed before they actually become available. Through the use of such advanced allocation techniques, the size of the local register files in both clusters may be significantly reduced.

Figure 6:
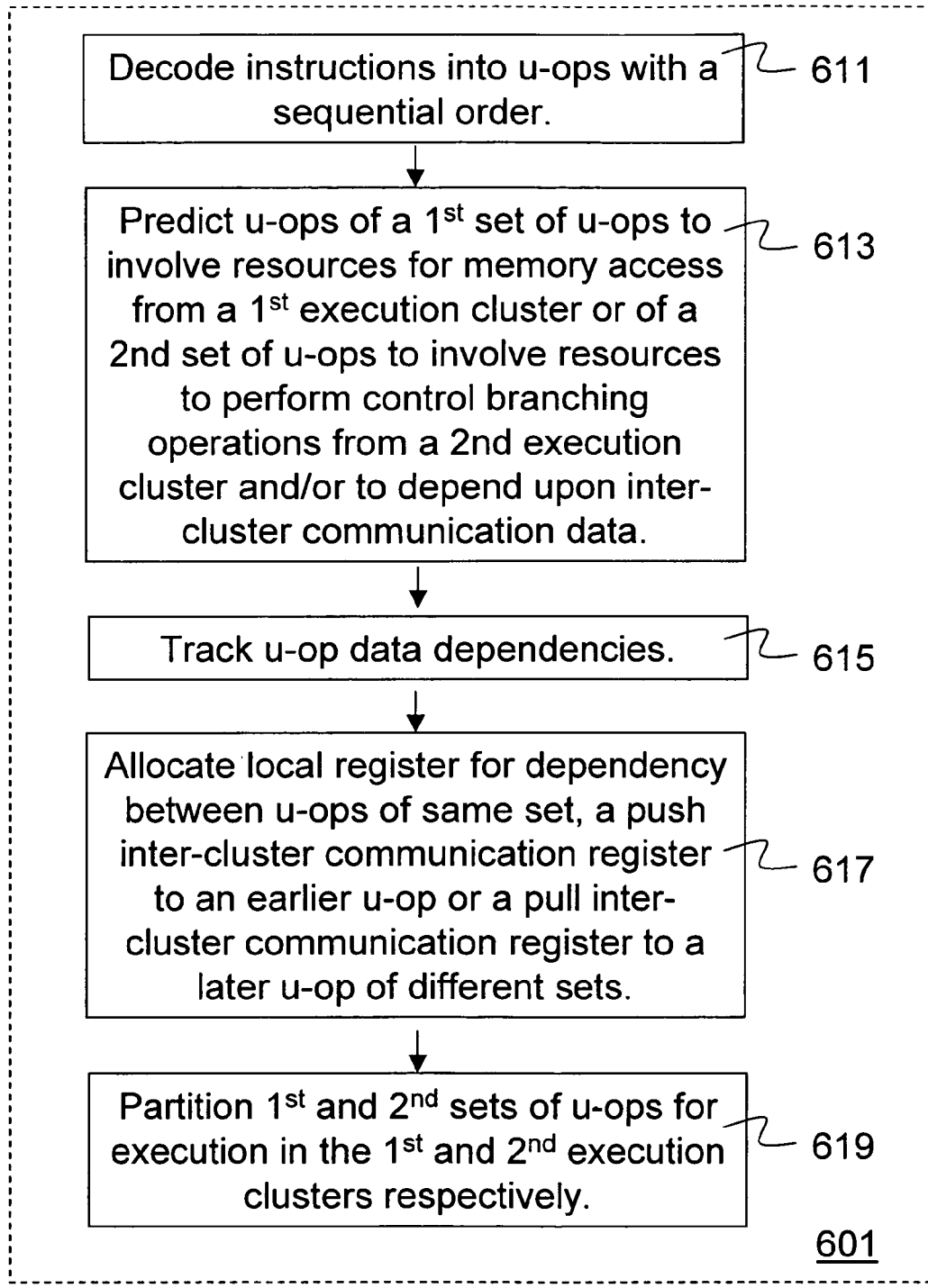
FIG. 6 illustrates a flow diagram for another alternative embodiment of a process to dynamically allocate resources in a processor according to inter-cluster communications.

FIG. 6 illustrates a flow diagram for another alternative embodiment of a process 601 to dynamically allocate resources in a processor according to inter-cluster communications. In processing block 611, macro-instructions having a sequential instruction ordering are decoded into micro-operations representing the sequential instruction ordering. Processing continues in processing block 613 where micro-operations are predicted to be of a first set to perform memory access operations and inter-cluster communication or of a second set to perform control branching operations and/or being dependent upon inter-cluster data communications from the first set of micro-operations. In processing block 615, data dependencies between micro-operations are tracked, optionally according to their sequential instruction ordering or according to their causal relationships. In processing block 617 a local register is allocated when a later micro-operation is identified to depend upon data from some earlier micro-operation of the same set, a push inter-cluster communication register is allocated when the later micro-operation is identified to depend upon data from some earlier micro-operation that is not of the same set, and a pull inter-cluster communication register is allocated to the later micro-operation, the pull inter-cluster communication register to receive a copy of another local register when the later micro-operation is identified to depend upon data in the other local register and that local register is not one that can be allocated to micro-operations of the same set as the later micro-operation. For example, as described above, if an earlier micro-operation of a different set was allocated a local register and allocate/rename logic 512 can no longer allocate an inter-cluster communication register for that earlier micro-operation, an inter-cluster communication register is allocated for the later micro-operation and an additional micro-operation is inserted to copy the data from the local register into the newly allocated inter-cluster communication register. In processing block 619, the micro-operations are partitioned for execution in accordance with their predictions, the first set of micro-operations to a first cluster of execution resources and the second set of micro-operations to a second cluster of execution resources.

It will be appreciated that process 601 may optionally include, as described above, executing the first and second sets of micro-operations out of their sequential orders and retiring the micro-operations in a retirement buffer to represent the sequential macro-instruction ordering.

Figure 7:
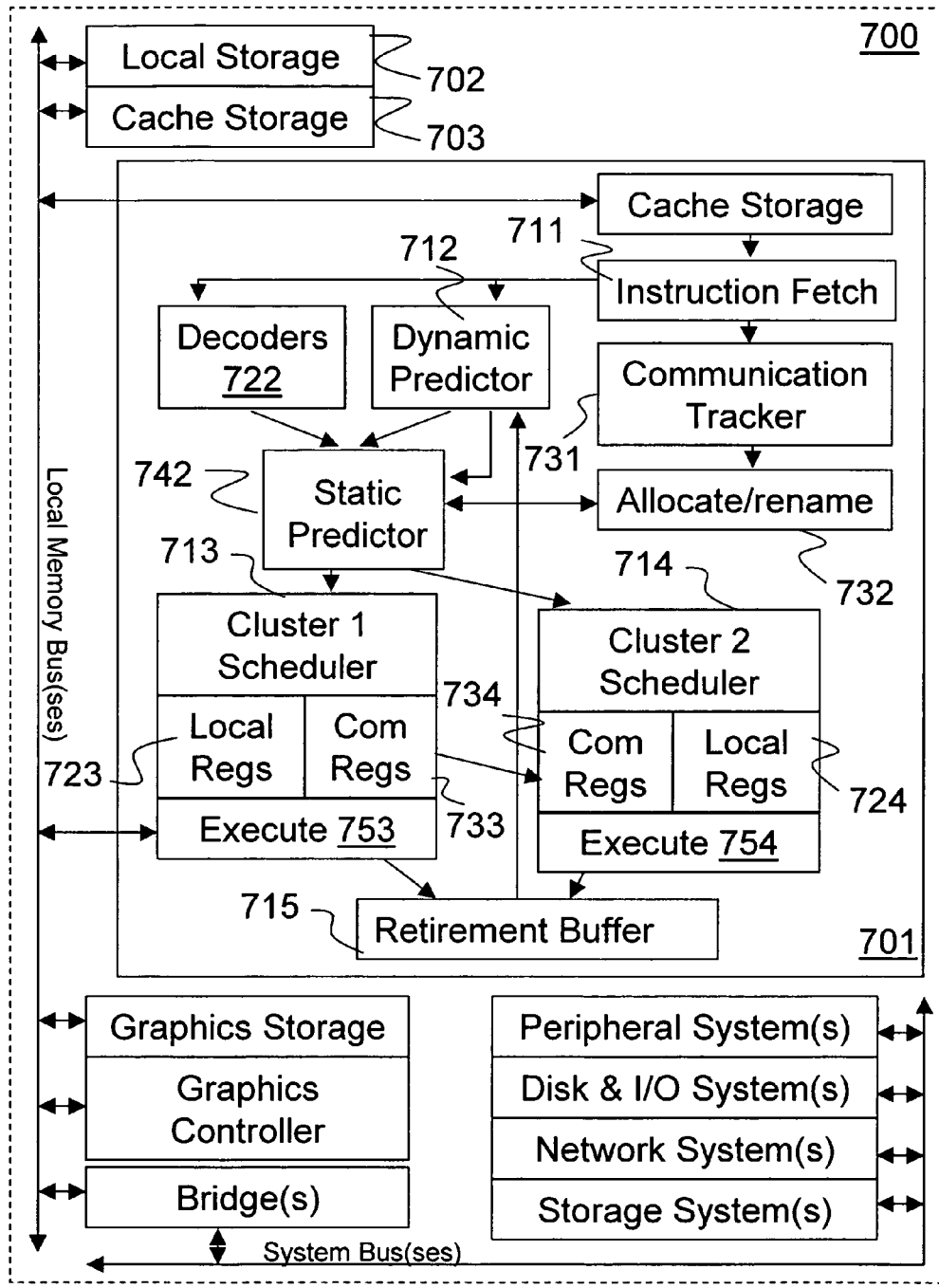
FIG. 7 illustrates one embodiment of a computing system including a processor to perform dynamic partitioning of operation execution.

FIG. 7 illustrates one embodiment of a computing system 700 including a processor 701 to perform dynamic partitioning of micro-operation execution. Computing system 700 may include an addressable memory, local storage 702, and cache storage 703 to store data, graphics storage and a graphics controller, and various systems optionally including peripheral systems, disk and I/O systems, network systems including network interfaces to stream data for storage in addressable memory, and external storage systems including magnetic storage devices to store instructions, wherein the instructions being accessed by the processor 701, causes the processor to process micro-operations including dynamic partitioning of micro-operation execution.

Embodiments of processor 701 may include partitioning logic including dynamic predictor 712 and static predictor 742 to partition micro-operations into a first set of producer micro-operations and a second set of consumer micro-operations; a first cluster of execution resources including cluster 1 scheduler 713, local registers 723, inter-cluster communication registers 733 and execution units 753 to access data stored by the addressable memory; and a second cluster of execution resources distinct from but coupled with the first cluster of execution resources, the second cluster of execution resources including cluster 2 scheduler 714, local registers 724, inter-cluster communication registers 734 and execution units 754 to perform control branching of the sequential instruction ordering. Embodiments of processor 701 may also include allocation/rename logic 732 to allocate resources from the first cluster of execution resources to the first set of producer micro-operations, and to allocate execution resources from the second cluster of execution resources to the second set of consumer micro-operations, including allocating local register 723 and 724, allocating push inter-cluster communication registers 733 and pull inter-cluster communication registers 734. For some alternative embodiments of processor 701 cluster schedulers 713 and/or 714 may be coupled with allocation/rename logic 732 to insert a move micro-operation into their respective set of micro-operations to copy data from a local register to a pull inter-cluster communication register.

Embodiments of processor 701 may also include instruction fetch logic 711 and decoders 722 to decode macro-instructions according to a sequential instruction ordering into micro-operations representing the sequential instruction ordering, and a retirement buffer 715 to retire the micro-operations in accordance with the sequential instruction ordering they represent. For some embodiments of processor 701, retirement buffer 715 may be coupled with dynamic predictor 712 to update a dynamic prediction for a micro-operation as it is retired.

The above description is intended to illustrate preferred embodiments of the present invention. From the discussion above it should also be apparent that the invention may be modified in arrangement and detail by those skilled in the art without departing from the principles of the present invention within the scope of the accompanying claims.

What is claimed is:

1. A computer implemented method for execution of micro-operations comprising:
    decoding a plurality of macro-instructions having a sequential instruction ordering into a plurality of micro-operations representing the sequential ordering;
    predicting whether the plurality of decoded micro-operations belong to one of two sets of micro-operations before the micro-operations are dispatched to execution resources for execution, the two sets comprising:
        a first set of producer micro-operations, including memory access micro-operations and other micro-operations that, when executed, each produce a result that is written into a register which will in turn be read and used by memory access micro-operations occurring later in the sequential ordering, but not including branch micro-operations; and
        a second set of consumer micro-operations, including branch micro-operations and micro-operations in the sequential instruction ordering not included in the first set of micro-operations;
    partitioning the plurality of micro-operations representing the sequential instruction ordering into the two sets based on the predicting;
    allocating to the first set of micro-operations execution resources from a first cluster of execution resources including execution resources to execute the micro-operations in the first set including memory access operations but not including execution resources to perform control branching operations;
    allocating to the second set of micro-operations execution resources from a second cluster of execution resources including execution resources to execute micro-operations in the second set including control branching operations but not including execution resources to perform memory access operations;
    executing the first and second sets of micro-operations out of said sequential order; and retiring the first and second sets of micro-operations to represent the sequential instruction ordering.

2. The method of claim 1 further comprising:
    allocating to the first set of micro-operations execution resources to store operation results from the first cluster of execution resources accessible by the second set of micro-operations.

3. The method of claim 2 wherein executing and retiring the first set of micro-operations includes early reclaiming of local register resources.

4. The method of claim 3 wherein allocating execution resources to the second set of micro-operations includes pre-allocation of local register resources prior to their retirement.

5. An article of manufacture comprising
    a machine-accessible medium including data that, when accessed by a machine, cause the machine to perform the method of claim 4.

6. An apparatus comprising:
    a front end comprising:
        a decoder to decode a plurality of macro-instructions having a sequential instruction ordering into a plurality of micro-operations representing the sequential ordering;
        a dynamic predictor to predict whether the plurality of decoded micro-operations belong to one of two sets of micro-operations before the micro-operations are dispatched to execution resources for execution, the two sets comprising:
            a first set of producer micro-operations including memory access micro-operations and other micro-operations that, when executed, each produce a result that is written into a register which will in turn be read and used by memory access micro-operations occurring later in the sequential ordering but not including branch micro-operations, and
            a second set of consumer micro-operations including branch micro-operations and micro-operations in the sequential instruction ordering not included in the first set of micro-operations; and
        a micro-sequencer to partition the plurality of micro-operations representing the sequential instruction ordering into the two sets based on the predicting;
    a communication tracker to identify a communication direction for the plurality of micro-operations representing the sequential instruction ordering;
    a first cluster of execution resources including execution resources to execute the micro-operations in the first set including memory access operations;
    a second cluster of execution resources distinct from but coupled with the first cluster of execution resources, the second cluster of execution resources including execution resources to execute micro-operations in the second set including control branching operations;

allocation logic to allocate resources from the first cluster of execution resources to the first set of producer micro-operations, and to allocate execution resources from the second cluster of execution resources to the second set of consumer micro-operations; and retirement logic to retire the first and second sets of micro-operations to represent the sequential instruction ordering.

7. The apparatus of claim 6 wherein said allocation logic is further to:

allocate a first local register when a later micro-operation is identified to depend upon data from a first earlier micro-operation of the same set of micro-operations;

allocate a push inter-cluster communication register when the later micro-operation is identified to depend upon data from a second-earlier micro-operation that is not of the same set of micro-operations; and allocate a pull inter-cluster communication register to receive a copy of a second local register when the later micro-operation is identified to depend upon data in the second local register and the second local register is not one of a plurality of local registers allocated to micro-operations of the same set as the later micro-operation.

8. The apparatus of claim 7 wherein allocation of a push inter-cluster communication register occurs while the communication tracker is tracking the second earlier micro-operation and afterwards allocation of a pull inter-cluster communication register occurs.

9. A processor comprising:

a decoder to decode a plurality of macro-instructions having a sequential instruction ordering into a plurality of micro-operations representing the sequential ordering;

a dynamic predictor to predict whether the plurality of decoded micro-operations belong to one of two sets of micro-operations before the micro-operations are dispatched to execution resources for execution, the two sets comprising:

a first set of producer micro-operations including memory access micro-operations and other micro-operations that, when executed each produce a result that is written into a register which will in turn be read and used by memory access micro-operations occurring later in the sequential ordering but not including branch micro-operations; and a second set of consumer micro-operations including branch micro-operations and micro-operations in the sequential instruction ordering not included in the first set of micro-operations; and a partitioning logic to partition the plurality of micro-operations representing the sequential instruction ordering into the first set of producer micro-operations, and the second set of consumer micro-operations;

a first cluster of execution resources including execution resources to execute the micro-operations in the first set including memory access operations;

a second cluster of execution resources different from the first cluster of execution resources, the second cluster of execution resources including execution resources to execute micro-operations in the second set including control branching operations; and allocation logic to allocate resources from the first cluster of execution resources to the first set of producer micro-operations, and to allocate execution resources from the second cluster of execution resources to the second set of consumer micro-operations.

10. The processor of claim 9 further comprising:

retirement logic to retire the first and second sets of micro-operations to represent a sequential instruction ordering.

11. A computing system comprising:

an addressable memory to store data;

a processor including:

a decoder to decode a plurality of macro-instructions having a sequential instruction ordering into a plurality of micro-operations representing the sequential ordering;

a dynamic predictor to predict whether the plurality of decoded micro-operations belong to one of two sets of micro-operations before the micro-operations are dispatched to execution resources for execution, the two sets comprising:

a first set of producer micro-operations including memory access micro-operations and other micro-operations that, when executed, each produce a result that is written into a register which will turn be read and used by memory access micro-operations occurring later in the sequential ordering, but not including branch micro-operations; and a second set of consumer micro-operations including branch micro-operations and micro-operations in the sequential instruction ordering not included in the first set of micro-operations; and a partitioning logic to partition the plurality of micro-operations representing the sequential instruction ordering into the first set of producer micro-operations and the second set of consumer micro-operations;

a first cluster of execution resources including execution resources to access data stored by the addressable memory;

a second cluster of execution resources distinct from but coupled with the first cluster of execution resources, the second cluster of execution resources including execution resources to perform control branching of the sequential instruction ordering; and allocation logic to allocate resources from the first cluster of execution resources to the first set of producer micro-operations, and to allocate execution resources from the second cluster of execution resources to the second set of consumer micro-operations;

a magnetic storage device to store the plurality of macro-instructions to be decoded according to the sequential instruction ordering.

12. The computing system of claim 11 wherein said allocation logic is further to:

allocate a first local register when a later micro-operation is identified to depend upon data from a first earlier micro-operation of the same set of micro-operations;

allocate a push inter-cluster communication register when the later micro-operation is identified to depend upon data from a second earlier micro-operation that is not of the same set of micro-operations; and allocate a pull inter-cluster communication register to receive a copy of a second local register when the later micro-operation is identified to depend upon data in the second local register and the second local register is not one of a plurality of local registers allocated to micro-operations of the same set as the later micro-operation.

* * * * *